(12) United States Patent
Choi et al.

(10) Patent No.: US 11,784,330 B2
(45) Date of Patent: Oct. 10, 2023

(54) SYSTEM AND METHOD FOR CONTROLLING FUEL CELL

(71) Applicants: HYUNDAI MOTOR COMPANY, Seoul (KR); KIA MOTORS CORPORATION, Seoul (KR)

(72) Inventors: Sung Bum Choi, Seongnam-si (KR); Choong Woon Lim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 246 days.

(21) Appl. No.: 16/903,352

(22) Filed: Jun. 16, 2020

(65) Prior Publication Data
US 2021/0175521 A1 Jun. 10, 2021

(30) Foreign Application Priority Data
Dec. 4, 2019 (KR) ........................ 10-2019-0159933

(51) Int. Cl.
*H01M 8/04029* (2016.01)
*H01M 8/04007* (2016.01)
*H01M 8/04955* (2016.01)
*H01M 8/04701* (2016.01)

(52) U.S. Cl.
CPC ... *H01M 8/04029* (2013.01); *H01M 8/04074* (2013.01); *H01M 8/04723* (2013.01); *H01M 8/04955* (2013.01); *H01M 2250/20* (2013.01)

(58) Field of Classification Search
CPC ......... H01M 2250/20; H01M 8/04029; H01M 8/04074; H01M 8/04723; H01M 8/4955; H01M 8/04303; H01M 8/0432; H01M 8/04358; H01M 8/04589; H01M 8/04619; H01M 8/04768; Y02E 60/50
See application file for complete search history.

(56) References Cited

U.S. PATENT DOCUMENTS

2012/0183875 A1* 7/2012 Yumita ............. H01M 8/04225
429/434

FOREIGN PATENT DOCUMENTS

JP 2005322527 A * 11/2005
KR 101405551 B1 6/2014

* cited by examiner

*Primary Examiner* — Adam A Arciero
(74) *Attorney, Agent, or Firm* — MCDONNELL BOEHNEN HULBERT & BERGHOFF LLP

(57) ABSTRACT

Disclosed is a fuel cell control system including: a fuel cell supplied with each of hydrogen and oxygen and configured to generate electric power by means of a chemical reaction therein; a cooling system having a heat-exchange device capable of exchanging heat with external air, the cooling system being configured such that cooling water circulates therein and exchanges heat with the fuel cell; a temperature sensing unit configured to sense a fuel cell temperature or a cooling water temperature in the cooling system; and a cooling control unit configured to control the cooling system so as to additionally cool the fuel cell when the fuel cell stops generating electric power, if the fuel cell temperature or the cooling water temperature sensed by the temperature sensing unit while the fuel cell generates electric power is equal to or higher than a preconfigured performance degradation temperature.

5 Claims, 5 Drawing Sheets

FIG. 4

| Operating mode and condition: high-output operating ↔ cooling | | | Operating temperature in case of high-output static current(℃) | | |
|---|---|---|---|---|---|
| | | | 65 | 70 | 78 |
| Final temperature when cooling after shutdown(℃) (Deterioration rate μv/hr) | Cooling temperature condition | Natural cooling | 49 (−16) | 53 (−120) | 58 (−251) |
| | | Maintain Del T 5℃ | 60 (−126) | 65 | 73 |
| | forced cooling (35℃) | | 35 | 35 | 35 (+14) |

SYSTEM AND METHOD FOR CONTROLLING FUEL CELL

CROSS REFERENCE TO RELATED APPLICATION

The present application claims priority to Korean Patent Application No. 10-2019-0159933, filed Dec. 4, 2019, the entire contents of which is incorporated herein for all purposes by this reference.

BACKGROUND OF THE INVENTION

1. Field of the Invention

The present disclosure relates to a system and a method for controlling a fuel cell and, more specifically, to a system for recovering performance after a continued high-output operation of a fuel cell.

2. Background

A fuel cell is configured to convert chemical energy to electric energy by using an oxidation-reduction reaction of hydrogen and oxygen supplied from a hydrogen supply device and an air supply device, respectively, and includes a fuel cell stack for producing electric energy, a cooling system for cooling the same, and the like.

That is, hydrogen is supplied to the anode of the fuel cell, an oxidation reaction of hydrogen proceeds in the anode, thereby generating protons and electrons, and the generated protons and electrons move to the cathode through an electrolyte film and a separating plate. Electric energy is generated in the cathode through an electrochemical reaction in which the protons and electrons from the anode and oxygen in the air participate.

Fuel cells have been introduced not only for passenger cars, but also for sport utility vehicles (SUVs). Fuel cells are also applicable to commercial vehicles, such as buses and trucks, requiring high-output traveling, such that traveling distances can be secured, and environment-friendly merits can be used.

Particularly, there is a problem in the commercial vehicle field in that high-output traveling may continue for a long time if a long distance is covered, or if the load is large, but the maximum cooling performance of the cooling system of the fuel cell vehicle is limited, inevitably operating the fuel cell at a high temperature.

A passenger car or an SUV may include controls for limiting the output of the fuel cell so as to avoid high-temperature operation of the fuel cell. However, in the case of a commercial vehicle, it is difficult to limit the output because of the possibility that the vehicle's driving will stop, thereby posing a problem in terms of stability. Therefore, fuel cells applied to commercial vehicles are exposed to high temperatures and thus degrade the performance, thereby posing the problem of durability degradation.

The above descriptions are merely to facilitate understanding of the background of the present disclosure, and are not to be regarded by a person skilled in the art as corresponding to prior art.

SUMMARY

The present disclosure has been made in order to solve the above-mentioned problems, and an aspect of the present disclosure is to provide a technology for performing cooling control such that, if high output of a fuel cell continues, the performance of the fuel cell is restored when the fuel cell stops generating electric power.

In accordance with an aspect of the present disclosure, there is provided a fuel cell control system including: a fuel cell supplied with each of hydrogen and oxygen and configured to generate electric power by means of a chemical reaction therein; a cooling system having a heat-exchange device capable of exchanging heat with external air, the cooling system being configured such that cooling water circulates therein and exchanges heat with the fuel cell; a temperature sensing unit configured to sense a fuel cell temperature or a cooling water temperature in the cooling system; and a cooling control unit configured to control the cooling system so as to additionally cool the fuel cell when the fuel cell stops generating electric power, if the fuel cell temperature or the cooling water temperature sensed by the temperature sensing unit while the fuel cell generates electric power is equal to or higher than a preconfigured performance degradation temperature.

The temperature sensing unit may measure the temperature of cooling water flowing into the entrance of the fuel cell among cooling water in the cooling system.

The fuel cell control system may further include a monitoring unit configured to monitor the magnitude of electric power or electric current output from the fuel cell when the fuel cell generates electric power. The cooling control unit may control the cooling system so as to additionally cool the fuel cell when electric power generation stops if the monitored magnitude of electric power or electric current from the fuel cell is equal to or higher than a preconfigured high-power reference or a preconfigured high-current reference.

The fuel cell control system may further include a time measuring unit configured to accumulate and measure a time during which the magnitude of electric power or electric current monitored by the monitoring unit is maintained to be equal to or higher than the preconfigured high-power reference or the preconfigured high-current reference, since the fuel cell was started. The cooling control unit may control the cooling system so as to additionally cool the fuel cell when electric power generation stops, if the accumulated time measured by the time measuring unit is equal to or longer than a preconfigured time.

The cooling control unit may control the cooling system so as to cool the fuel cell for a preconfigured first recovery time since the request for stopping electric power generation by the fuel cell.

The cooling control unit may control the cooling system so as to cool the fuel cell for a preconfigured second recovery time after cooling water is cooled to a preconfigured recovery temperature.

The cooling system may include a cooling pump configured to circulate cooling water and a cooling fan configured to circulate external air near a radiator. The cooling control unit may control the rate of rotation of the cooling pump or the rate of rotation of the cooling fan at a maximum level until the cooling water temperature drops to a preconfigured recovery temperature, and to control the cooling system such that the cooling water temperature is maintained at the preconfigured recovery temperature for a second recovery time.

The fuel cell control system may further include a starting control unit configured to determine whether or not to control the cooling system of the cooling control unit if shutdown of the fuel cell is requested, and to control shutdown of the fuel cell after control of the cooling system of the cooling control unit is completed.

In accordance with another aspect of the present disclosure, there is provided a fuel cell control method including: sensing a fuel cell temperature or cooling water temperature in a cooling system when a fuel cell generates electric power; comparing the sensed fuel cell temperature or cooling water temperature with a preconfigured performance degradation temperature; and controlling the cooling system so as to additionally cool the fuel cell when the fuel cell stops generating electric power if the sensed fuel cell temperature or cooling water temperature is equal to or higher than the preconfigured performance degradation temperature.

The fuel cell control method may further include monitoring the magnitude of electric power or electric current output from the fuel cell when the fuel cell generates electric power, before controlling the cooling system. The cooling system may be controlled so as to additionally cool the fuel cell when electric power generation stops, if the monitored magnitude of electric power or electric current from the fuel cell is equal to or higher than a preconfigured high-power reference or a preconfigured high-current reference.

The fuel cell control method may further include accumulating and measuring a time during which the magnitude of electric power or electric current, which is monitored after the fuel cell is started, is maintained to be equal to or higher than the preconfigured high-power reference or the preconfigured high-current reference, after the monitoring the magnitude of electric power or electric current. During the controlling the cooling system step, the cooling system may be controlled so as to additionally cool the fuel cell when electric power generation stops, if the accumulated time measured by a time measuring unit is equal to or longer than a preconfigured time.

In the controlling the cooling system step, the cooling system may be controlled so as to cool the fuel cell for a preconfigured second recovery time after cooling water is cooled to a preconfigured recovery temperature.

In the controlling the cooling system step, the rate of rotation of a cooling pump or the rate of rotation of a cooling fan may be controlled at a maximum level until the cooling water temperature drops to a preconfigured recovery temperature, and the cooling system is controlled such that the cooling water temperature is maintained at the preconfigured recovery temperature for a second recovery time.

The fuel cell control method may further include controlling shutdown of the fuel cell after control of the cooling system of the cooling control unit is completed, if shutdown control of the fuel cell is requested after the controlling the cooling system.

The system and method for controlling a fuel cell according to the present disclosure are advantageous in that the performance of a fuel cell stack, which is degraded when the fuel cell generates electric power, is restored.

In addition, the power generation efficiency of the fuel cell is improved by recovering the performance of the fuel cell, thereby improving the fuel efficiency.

In addition, deterioration of the fuel cell stack is delayed, thereby improving the durability, and this lengthens the life of the fuel cell stack.

BRIEF DESCRIPTION OF THE DRAWINGS

The above and other aspects, features and advantages of the present disclosure will be more apparent from the following detailed description taken in conjunction with the accompanying drawings, in which:

FIG. 4 is a table illustrating performance degradation of a fuel cell according to a cooling condition in a suspension period.

DETAILED DESCRIPTION OF THE EXEMPLARY EMBODIMENTS

Figure 1:
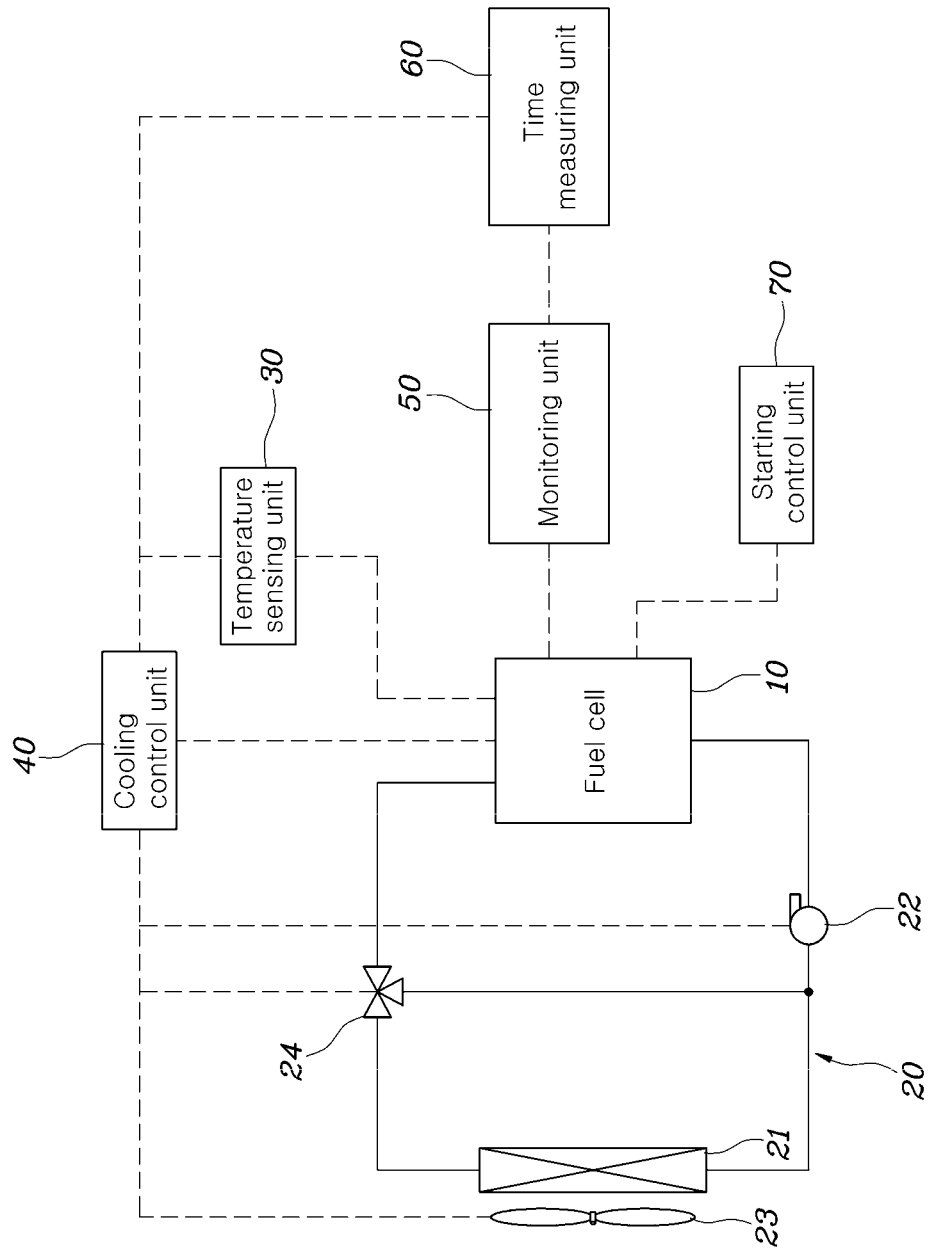
FIG. 1 is a diagram illustrating the configuration of a fuel cell control system according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by such terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

In the present specification, the terms are merely used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, a preferred embodiment of the present disclosure will be described in detail with reference to the accompanying drawings. Similar reference numerals presented in the drawings denote similar elements.

FIG. 1 is a diagram illustrating the configuration of a system for controlling a fuel cell 10 according to an embodiment of the present disclosure.

Referring to FIG. 1, the system for controlling a fuel cell 10 according to an embodiment of the present disclosure includes: a fuel cell 10 supplied with each of hydrogen and oxygen and configured to generate electric power by means of a chemical reaction therein; a cooling system 20 having a heat-exchange device 21 capable of exchanging heat with external air, the cooling system 20 being configured such that cooling water circulates therein and exchanges heat with the fuel cell 10; a temperature sensing unit 30 configured to sense the temperature of the fuel cell 10 or the cooling water temperature in the cooling system 20; and a cooling control unit 40 configured to control the cooling system 20 so as to additionally cool the fuel cell 10 when the fuel cell 10 stops generating electric power, if the temperature of the fuel cell 10 or the cooling water temperature, which is sensed by the temperature sensing unit 30 while the fuel cell 10 generates electric power, is equal to or higher than a preconfigured performance degradation temperature.

The fuel cell 10 refers to a fuel cell stack 10 including multiple unit cells stacked on each other. The fuel cell 10 may be supplied with hydrogen from a hydrogen supply system and supplied with oxygen included in the air from an air supply system, thereby inducing a chemical reaction therein.

Electrons may be moved by the reaction of the hydrogen and oxygen inside the fuel cell 10, thereby generating an electric current and electric power. In addition, generated water may be generated by the chemical reaction of the hydrogen and oxygen in the fuel cell 10, thereby generating additional thermal energy.

The cooling system 20 may circulate cooling water so as to discharge heat generated inside the fuel cell 10 to the outside. The cooling system 20 may include a cooling pump 22 for circulating cooling water, a heat-exchange device 21 for exposing the cooling water circulating therein to the outside such that the same can exchange heat with external air, and a cooling fan 23 for circulating external air near the heat-exchange device 21 thereby amplifying heat exchange of the heat-exchange device 21.

Additionally, the cooling system 20 may further include a flow rate adjustment valve 24 for adjusting the flow rate ratio between cooling water flowing to the heat-exchange device 21 (radiator) and cooling water bypassing the heat-exchange device 21.

The cooling control unit 40 may control the cooling pump 22, the cooling fan 23, and the flow rate adjustment valve 24 of the cooling system 20, thereby controlling the cooling of the fuel cell 10. Specifically, the RPM of the cooling pump 22 and the cooling fan 23 may be controlled, or the degree of opening of the flow rate adjustment valve 24 may be controlled, thereby controlling the temperature or flow rate of cooling water flowing into the fuel cell 10.

The temperature sensing unit 30 may sense the temperature of the fuel cell 10 or the cooling water temperature in the cooling system 20 while the fuel cell 10 generates electric power. Since it is difficult to directly measure the temperature of the fuel cell 10, the temperature sensing unit 30 may estimate the temperature of the fuel cell 10 on the basis of the cooling water temperature near the entrance or exit of the fuel cell 10.

The cooling control unit 40 may cool the fuel cell 10 when the fuel cell 10 stops generating electric power. As used herein, stopping the generation of electric power may refer to suspending electric power generation by the fuel cell 10 while the fuel cell 10 remains turned on (idle stop (FC STOP)), or turning off the fuel cell 10.

In general, the chemical reaction occurring inside the fuel cell 10 is suspended if it is requested that the fuel cell 10 be turned off or enter the idle stop mode, and cooling control of the fuel 10 is also suspended accordingly.

The cooling control unit 40 according to an embodiment of the present disclosure may control the cooling system 20 so as to additionally cool the fuel cell 10 if it is requested that the fuel cell 10 be turned off or enter the idle stop mode. Particularly, the cooling control unit 40 may control the cooling system 20 as to additionally cool the fuel cell 10 if the temperature of the fuel cell 10 or the cooling water temperature, which is sensed by the temperature sensing unit 30 when the fuel cell 10 generates electric power, is equal to or higher than a preconfigured performance degradation temperature.

The preconfigured performance degradation temperature may be a preconfigured high temperature at which performance degradation of the fuel cell 10 is more likely to occur. Accordingly, it is determined whether or not the fuel cell 10 has been exposed to a high temperature while the fuel cell 10 generates electric power, and cools the fuel cell 10 when the fuel cell 10 stops generating electric power, if the same has been exposed to a high temperature, thereby recovering the performance of the fuel cell 10. Specifically, the cooling system 20 cools the fuel cell 10 such that vapor is condensed inside the fuel cell 10, which has reached a dry-out state. Accordingly, the humidity is increased such that the fuel cell 10 reaches a humid state, thereby recovering the same.

The temperature sensing unit 30 may measure the temperature of cooling water flowing into the entrance of the fuel cell 10, among the cooling water in the cooling system 20.

The temperature sensing unit 30 may measure the temperature of cooling water at various locations in the cooling system 20, or may estimate the temperature of the fuel cell 10. Particularly, the temperature sensing unit 30 may measure the temperature of cooling water flowing into the entrance of the fuel cell 10.

If the temperature of cooling water flowing into the entrance of the fuel cell 10 is equal to or higher than the preconfigured performance degradation temperature, it is difficult to cool the fuel cell 10 to a temperature below the preconfigured performance degradation temperature. In such a situation, the operating temperature of the fuel cell 10 is maintained above the preconfigured performance degradation temperature.

The fuel cell control system may further include a monitoring unit 50 for monitoring the magnitude of electric power or electric current output from the fuel cell 10 when the fuel cell 10 generates electric power. The cooling control unit 40 may control the cooling system 20 so as to additionally cool the fuel cell 10 when electric power generation stops, if the monitored magnitude of electric power or electric current from the fuel cell 10 is equal to or higher than a preconfigured high-power reference or a preconfigured high-current reference.

The monitoring unit 50 may monitor the magnitude of electric power or electric current output from the fuel cell 10 while the fuel cell generates electric power. The monitoring unit 50 may be connected to a voltage sensor or a current sensor for measuring the voltage or current from a main bus stage connected between the fuel cell 10 and a driving system (for example, a motor).

The cooling control unit 40 may determine whether or not the magnitude of electric power output from the fuel cell 10 is equal to or higher than a preconfigured high-power reference, or whether or not the magnitude of electric current output from the fuel cell 10 is equal to or higher than a preconfigured high-current reference, and may additionally cool the fuel cell 10 when power generation stops, if the high-power reference or high-current reference is exceeded.

The fuel cell control system may further include a time measuring unit 60 configured to accumulate and measure a time during which the magnitude of electric power or electric current from the fuel cell 10, which is monitored by the monitoring unit 50, is maintained to be equal to or higher than the preconfigured high-power reference or the preconfigured high-current reference, since the fuel cell 10 was started. The cooling control unit 40 may control the cooling system 20 so as to additionally cool the fuel cell 10 when electric power generation stops, if the accumulated time measured by the time measuring unit 60 is equal to or longer than a preconfigured time.

The time measuring unit 60 may measure the time during which the monitored magnitude of electric power or current from the fuel cell 10 is maintained equal to or higher than the preconfigured high-power reference or preconfigured high-current reference. Particularly, the time measuring unit 60 may measure the time accumulated until the fuel cell 10 stops power generation since the fuel cell 10 was started.

The cooling control unit 40 may control the cooling system 20 so as to additionally cool the fuel cell 10 only if the measured accumulated time is longer than the preconfigured time. That is, control may be requested such that, if the fuel cell 10 is continuously operated with a high output for a long period of time, the fuel cell 10 is cooled and thus recovered.

In another embodiment, the cooling control unit 40 may increase the recovery time during which the fuel cell 10 is additionally cooled, in proportion to the measured accumulated time.

If the fuel cell 10 is operated with a high output, the fuel cell 10 may be exposed to a high temperature due to insufficient cooling performance of the cooling system 20. If the fuel cell 10 is exposed to a high temperature, the air inlet through which air flows into the fuel cell 10 reaches a dry-out state, and the area thereof increases over time. This causes a problem in that the inner resistance of the fuel cell 10 increases. That is, high-output operation of the fuel cell 10 is followed by performance degradation of the fuel cell 10.

Additionally, as the dry-out state of the air inlet of the fuel cell 10 expands, the resistance of the film included in the fuel cell 10 increases. This results in irreversible deterioration of the fuel cell 10. Furthermore, when the fuel cell 10 is restarted, a lower performance is maintained due to the performance degradation. This increases heat generated by the reaction of hydrogen and oxygen, thereby posing a problem of further increase in the operating temperature of the fuel cell 10.

Figure 2:
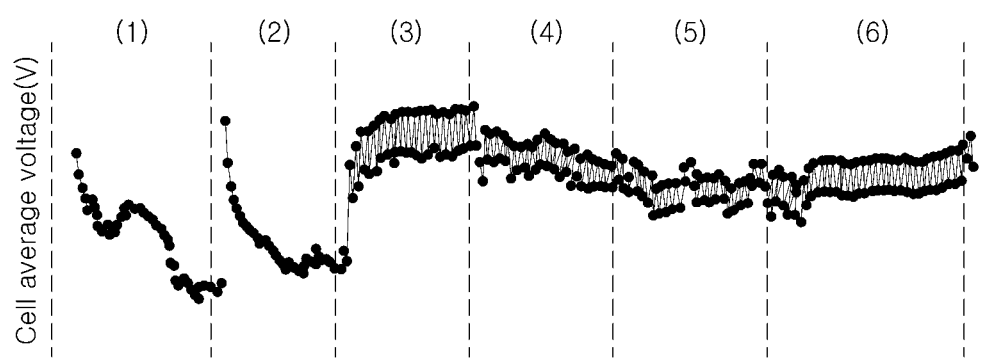
FIG. 2 illustrates performance degradation resulting from high-output operation of a fuel cell under various conditions.

FIG. 2 illustrates performance degradation resulting from high-output operation of the fuel cell 10 under various conditions.

Further referring to FIG. 2, the cell average voltage of the fuel cell 10 is illustrated, in connection with a continuing operation time of the fuel 10 in each condition. Particularly, FIG. 2 enumerates experiment data under operating conditions of the fuel cell 10 for tens of hours.

Specifically, the cell average voltage refers to the average voltage of unit cells included in the fuel cell 10 while the fuel cell 10 outputs the same current. A decrease in the cell average voltage while the same current is output means a decrease in power output from the fuel cell 10. That is, a decrease in the illustrated cell average voltage means degradation in the performance of the fuel cell 10.

Firstly, (1) corresponds to a situation in which the fuel cell 10 continuously outputs a high current, and corresponds to a condition in which the fuel cell 10 is operated with no suspension period (without interrupting power generation). Degradation in the performance of the fuel cell 10 as a result of continuous high-current operation of the fuel cell 10 can be confirmed.

In the situation of (2), the fuel cell 10 is operated to alternately output a high current and a lower current, and this corresponds to a condition in which the fuel cell 10 is operated with no suspension period (without interrupting power generation). It can be confirmed that, if no suspension period is included, the performance of the fuel cell 10 is continuously degraded.

In the cases of (3) and (4), the fuel cell 10 is operated to alternately output a high current and a lower current, and power generation by the fuel cell 10 is suspended every two hours. That is, under the conditions of (3) and (4), a suspension period is included every two hours of power generation.

Particularly, a suspension period of ten minutes is maintained in the case of (3), and a suspension period of ten seconds is maintained in the case of (4). In both cases of (3) and (4), cooling water is circulated to cool the fuel cell 10 in each suspension period.

It can be confirmed that, in the cases of (3) and (4), the cooling system 20 is controlled to cool the fuel cell 10 when power generation is suspended, thereby maintaining the performance of the fuel cell 10. Particularly, it can be confirmed from a comparison between the result of (3) with the result of (4) that the longer the suspension period, the higher performance of the fuel cell 10 is maintained.

In the cases of (5) and (6), the fuel cell 10 is operated to continuously output a high current, and power generation by the fuel cell 10 is suspended every two hours. That is, under the conditions of (5) and (6), a suspension period is included every two hours of power generation.

In the case of (5), the suspension period is maintained for ten seconds such that natural cooling occurs. In the case of (6), the suspension period is maintained for one minute, and the cooling system 20 is controlled to circulate cooling water. It can be confirmed from a comparison between the result of (6) with the result of (5) that, by circulating cooling water at a low temperature during the suspension period, the cooling performance is improved, thereby maintaining a better performance of the fuel cell 10.

Figure 3:
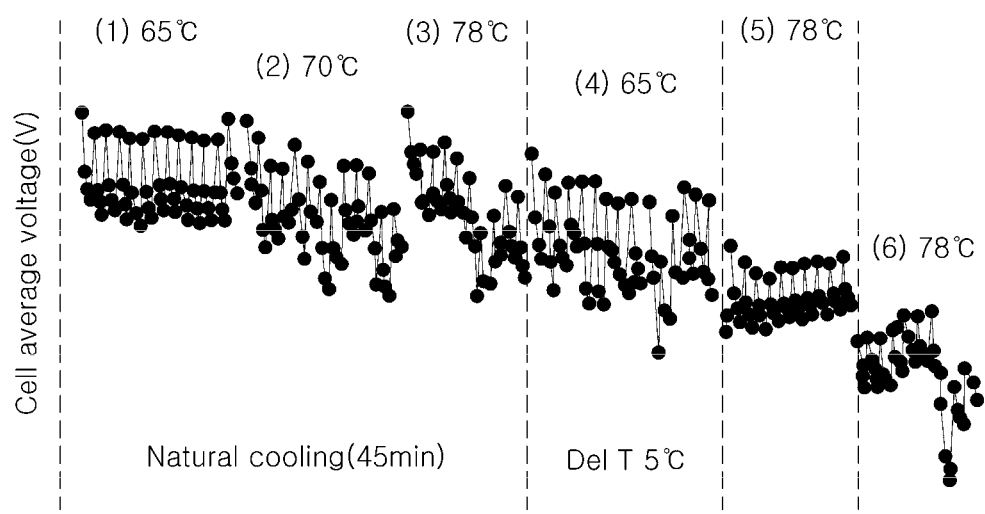
FIG. 3 is a graph illustrating the operating temperature of a fuel cell.

FIG. 3 is a graph illustrating the operating temperature of the fuel cell 10. FIG. 4 is a table illustrating performance degradation of the fuel cell 10 according to a cooling condition in a suspension period.

Further referring to FIG. 3 and FIG. 4, tests are repeated under the conditions of (1) to (3) that the full cell 10 be cooled in a suspension period in the process of operating the fuel cell 10 so as to output a high current while varying the operating temperature of the fuel cell 10.

It can be confirmed from a comparison of the results of (1) to (3) that, although little performance degradation occurs if the operating temperature of the fuel cell 10 is relatively low, the performance degradation of the fuel cell 10 gradually increases to a substantial level as the operating temperature rises gradually.

That is, the higher the temperature the fuel cell 10 is exposed to, the larger performance degradation of the fuel cell 10 occurs.

Under the condition of (4), tests are repeated while operating the fuel cell 10 so as to output a high current, and is naturally cooled for a short suspension period such that the temperature of the fuel cell 10 decreases by 5[° C.].

It can be confirmed from a comparison between the result (4) and those of (1) to (3) that, if the temperature of the fuel cell 10 does not decrease sufficiently during the suspension period, performance degradation occurs even if the fuel cell 10 is operated at a relatively low temperature.

Accordingly, it can be confirmed that the performance of the fuel cell 10 can be recovered if the temperature of the fuel cell 10 is lowered by sufficiently cooling the fuel cell 10 during the suspension period (during power generation suspension).

That is, the performance of the fuel cell 10 can be recovered only if the fuel cell 10 is sufficiently cooled through forced cooling.

In addition, under the conditions of (5) and (6), tests are repeated while operating the fuel cell 10 so as to output a high current at a relatively high temperature of the fuel cell 10, and a long suspension period and a short suspension period are maintained, respectively.

Particularly, under the condition of (5), the fuel cell 10 is cooled to 35[° C.] by forcibly cooling the same for a long time with cooling water at 35[° C.]. Under the condition of (6), the fuel cell 10 is forcibly cooled for a short time, and the fuel cell 10 is thus not sufficiently cooled.

It is clear from the results of (5) and (6) that, even if the fuel cell 10 is operated at a relatively high temperature, the performance of the fuel cell 10 is recovered after a sufficient suspension period. In addition, it is difficult to sufficiently recover the performance of the fuel cell 10 if the suspension period does not last for a sufficient length of time.

In summary, the performance of the fuel cell 10 can be recovered only if the fuel cell 10 is cooled for a sufficient time when the fuel cell 10 stops generating power.

According to an embodiment, the cooling control unit 40 may control the cooling system 20 so as to cool the fuel cell 10 for a preconfigured first recovery time, which initiates upon a request for suspending power generation by the fuel cell 10.

The cooling control unit 40 may control the fuel cell 10 so as to stop generating power at the request for stopping power generation by the fuel cell 10. In an embodiment, the cooling control unit 40 may control air supply to the fuel cell 10 to suspend the air supply.

Simultaneously, the cooling control unit 40 may control the cooling system 20 so as to cool the fuel cell 10 for a preconfigured first recovery time. The preconfigured first recovery time may be preconfigured so as to last about 30 minutes or more, which is enough time for the vapor inside the fuel cell 10 to undergo a state change to a droplet state.

According to another embodiment, the cooling control unit 40 may control the cooling system 20 so as to cool the fuel cell 10 for a preconfigured second recovery time, after cooling the cooling water to a preconfigured recovery temperature.

The cooling control unit 40 may control the cooling system 20 so as to cool the fuel cell 10 at a request for stopping power generation by the fuel cell 10, and may cool the cooling water to a preconfigured recovery temperature. Particularly, the cooling control unit 40 may control the cooling system 20 so as to cool the fuel cell 10 for a preconfigured second recovery time after the cooling water drops to a preconfigured recovery temperature.

As used herein, the temperature of the cooling water refers to a temperature measured by the temperature sensing unit 30, and may be the temperature of cooling water flowing into the entrance of the fuel cell 10. The preconfigured recovery temperature may be about 30° C.

That is, the cooling control unit 40 may cool the fuel cell 10 while maintaining the cooling water for a preconfigured second recovery time.

The cooling system 20 may include a cooling pump 22 for circulating cooling water, and a cooling fan 23 for circulating external air near the radiator.

The cooling control unit 40 may control the rate of rotation of the cooling pump 22 or the rate of rotation of the cooling fan 23 at a maximum level until the cooling water temperature drops to a preconfigured recovery temperature, and may control the cooling system 20 such that the cooling water temperature is maintained at the preconfigured recovery temperature for a second recovery time.

The cooling control unit 40 may control the rate of rotation of the cooling pump 22 or the rate of rotation of the cooling fan 23 at a maximum level until the cooling water temperature drops to a preconfigured recovery temperature, at a request for stopping power generation by the fuel cell 10.

This abruptly lowers the temperature of the cooling system 20 that cools the fuel cell 10, thereby cooling the fuel cell 10, such that recovery of the fuel cell 10 can be maximized.

The cooling control unit 40 may control the cooling system 20 such that, if the temperature of the cooling system 20 drops to the preconfigured recovery temperature, the preconfigured recovery temperature is maintained thereafter. That is, the rate of rotation of the cooling pump 22 and the rate of rotation of the cooling fan 23 may be controlled such that the cooling water temperature is maintained at the preconfigured recovery temperature.

The fuel cell control system may further include a starting control unit 70 configured to determine whether or not to control the cooling system 20 of the cooling control unit 40 if shutdown of the fuel cell 10 is requested, and to control shutdown of the fuel cell 10 after control of the cooling system 20 of the cooling control unit 40 is completed.

If an input for turning off the fuel cell 10 is received, shutdown of the fuel cell 10 may be requested. Shutdown control of the fuel cell 10 may be control for storing the fuel cell 10, which has stopped generating power, for a long time (for example, cathode oxygen depletion (COD) control).

The starting control unit 70 may determine whether or not to control the cooling system 20 of the cooling control unit 40. Particularly, the starting control unit 70 may immediately conduct shutdown control of the fuel cell 10 if there is no request that the cooling control unit 40 control the cooling system 20 so as to additionally cool the fuel cell 10.

However, if there is a request that the cooling control unit 40 control the cooling system 20, the starting control unit 70 may control shutdown of the fuel cell 10 after the cooling control system 40 finishes controlling the cooling system 20.

Figure 5:
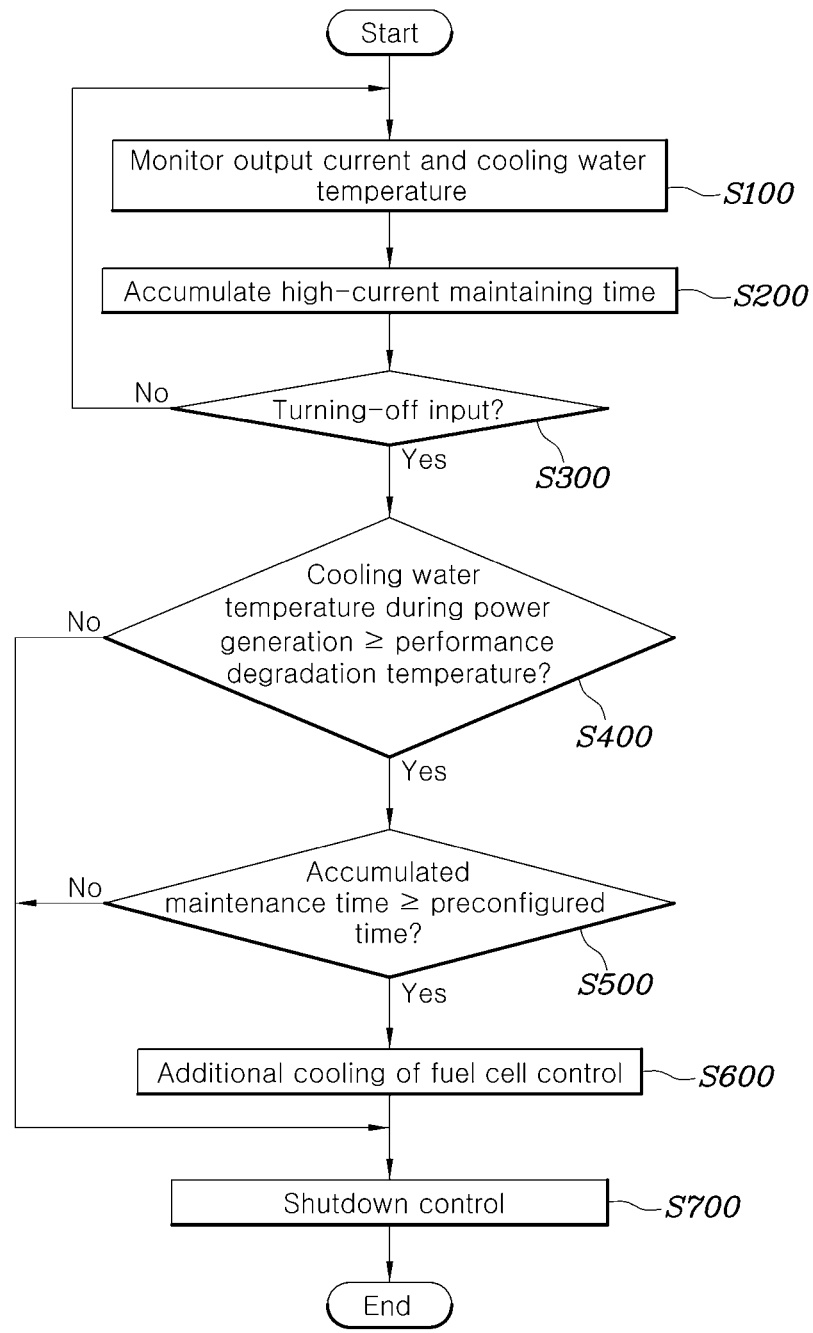
FIG. 5 is a flowchart of a fuel cell control method according to an embodiment of the present disclosure.

FIG. 5 is a flowchart of a method for controlling a fuel cell 10 according to an embodiment of the present disclosure.

Further referring to FIG. 5, the method for controlling a fuel cell 10 according to an embodiment of the present disclosure includes the steps of: sensing the temperature of the fuel cell 10 or the cooling water temperature of the cooling system 20 when the fuel cell 10 generates power (S100); comparing the sensed temperature of the fuel cell 10 or the sensed cooling water temperature with a preconfigured performance degradation temperature (S400); and controlling the cooling system 20 so as to additionally cool the fuel cell 10 when the fuel cell 10 stops generating power (S300), if the sensed temperature of the fuel cell 10 or the sensed cooling water temperature is equal to or higher than the preconfigured performance degradation temperature (S600).

The method may further include a step of monitoring the magnitude of electric current or power output from the fuel cell 10 when the fuel cell 10 generates power (S100), before the step of controlling the cooling system 20 (S600). In the step of cooling the cooling system 20 (S600), the cooling system 20 may be controlled to additionally cool the fuel cell 10 when power generation stops, if the monitored magnitude of electric power or current from the fuel cell 10 is equal to or higher than a preconfigured high-power reference or a preconfigured high-current reference.

The method may further include a step of accumulating and measuring the time during which the magnitude of electric power or electric current from the fuel cell 10, which is monitored after the fuel cell 10 is started, is maintained to be equal to or higher than the preconfigured high-power reference or the preconfigured high-current reference (S200), after the step of monitoring the magnitude of electric power or electric current (S100). In the step of controlling the cooling system 20 (S600), the cooling system 20 may be controlled so as to additionally cool the fuel cell 10 when electric power generation stops, if the accumulated time measured by a time measuring unit 60 is equal to or longer than a preconfigured time (S500).

In the step of controlling the cooling system 20 (S400), the cooling system 20 may be controlled so as to cool the fuel cell 10 for a second recovery time after the cooling water is cooled to a preconfigured recovery temperature.

In the step of controlling the cooling system 20 (S600), the rate of rotation of the cooling pump 22 or the rate of rotation of the cooling fan 23 may be controlled at a maximum level until the cooling water temperature drops to a preconfigured recovery temperature, and the cooling system 20 may be controlled such that the cooling water temperature is maintained at the preconfigured recovery temperature for a second recovery time.

The method may further include a step of controlling shutdown of the fuel cell 10 after control of the cooling system 20 of the cooling control unit 40 is completed, if shutdown control of the fuel cell is requested 10 (S700), after the step of controlling the cooling system 20 (S600).

The temperature sensing unit 30, the cooling control unit 40, the monitoring unit 50, the time measuring unit 60, and the starting control unit 70 according to an exemplary embodiment of the present disclosure may be implemented through a nonvolatile memory (not illustrated) configured to store an algorithm configured to control operations of various components of a vehicle or data regarding software instructions for reproducing the algorithm, and a processor (not illustrated) configured to perform operations described below by using the data stored in the memory. The memory and the processor may be implemented as individual chips. Alternatively, the memory and the processor may be implemented as a single integrated chip. The processor may take the form of one or more processors.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

What is claimed is:

1. A fuel cell control method comprising:
   sensing a fuel cell temperature or cooling water temperature in a cooling system when a fuel cell generates electric power;
   comparing the sensed fuel cell temperature or cooling water temperature with a preconfigured performance degradation temperature;
   controlling the cooling system so as to additionally cool the fuel cell when the fuel cell stops generating electric power if the sensed fuel cell temperature or cooling water temperature is equal to or higher than the preconfigured performance degradation temperature; and
   monitoring the magnitude of electric power or electric current output from the fuel cell when the fuel cell generates electric power, before the controlling the cooling system, wherein
   in the controlling the cooling system, the cooling system is controlled so as to additionally cool the fuel cell when electric power generation stops, if the monitored magnitude of electric power or electric current from the fuel cell is equal to or higher than a preconfigured power reference or a preconfigured current reference.

2. The fuel cell control method of claim 1, further comprising accumulating and measuring a time during which the magnitude of electric power or electric current, which is monitored after the fuel cell is started, is maintained to be equal to or higher than the preconfigured power reference or the preconfigured current reference, after the monitoring the magnitude of electric power or electric current, wherein
   in the controlling the cooling system, the cooling system is controlled so as to additionally cool the fuel cell when electric power generation stops, if the accumulated time measured by a time measuring unit is equal to or longer than a preconfigured time.

3. The fuel cell control method of claim 1, wherein, in the controlling the cooling system, the cooling system is controlled so as to cool the fuel cell for a preconfigured second recovery time after cooling water is cooled to a preconfigured recovery temperature.

4. The fuel cell control method of claim 3, wherein, in the controlling the cooling system, the rate of rotation of a cooling pump or the rate of rotation of a cooling fan is controlled at a maximum level until the cooling water temperature drops to a preconfigured recovery temperature, and the cooling system is controlled such that the cooling water temperature is maintained at the preconfigured recovery temperature for a second recovery time.

5. The fuel cell control method of claim 1, further comprising controlling shutdown of the fuel cell after control of the cooling system of the cooling control unit is completed, if shutdown control of the fuel cell is requested, after the controlling the cooling system.

* * * * *